No Printed Specification Available
6396X
L. Foster,
Door Latch.
Patented Feb. 25, 1831.
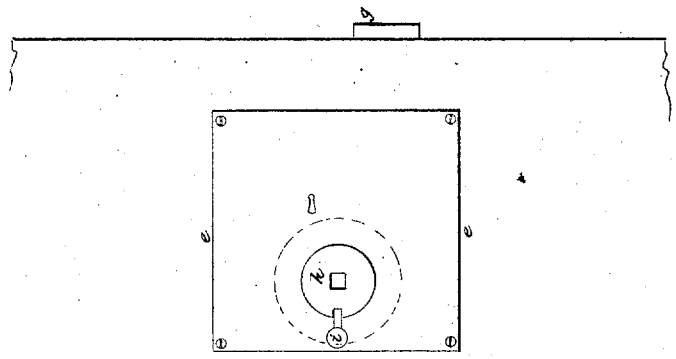
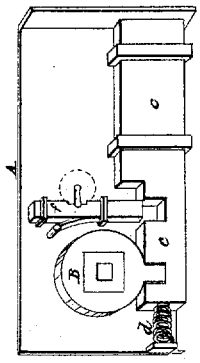
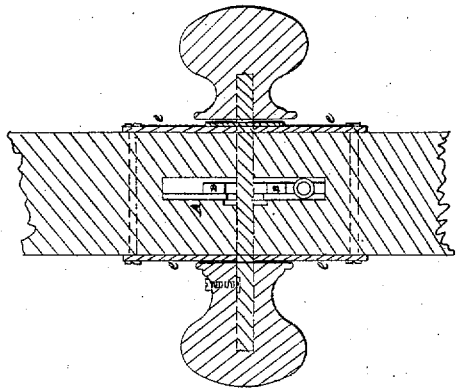
AM. PHOTO-LITHO. CO. N.Y. (OSBORNE'S PROCESS.)

Feb. 25. 1831 6396X 399

Leonard Foster

Letters Patent

The Schedule referred to in these Letters Patent & making part of the same containing a description in the words the said Leonard Foster himself of his improvement in mortise door fastenings.

Said Improvements consist in such a formation & combination of the known parts of door fastenings, not heretofore so formed and combined in mortise door fastenings as to result in a mortise door fastening occupying less than one half the space of such fastenings heretofore made and used hav-ing little more than half their thickness and width and by this diminished thickness & width extending the use of the mortised door fastenings to thinner or lighter doors than have heretofore been able to receive them and also in not reducing or weakening the mortise part of thicker doors so much as the common mortise fastenings.

This improved mortised door fastening only re-quiring a mortise of about two inches wide, admit of the escutcheons being secured to the solid parts of the door above & below the mortise or weak part which is thus strengthened, and the escutcheons do not work loose as when fastened on the thin shell of the mortised part of the door. Said escutcheons being part of said improved door fastening are formed of plates of sheet iron or other suitable metal each three inches square and are secured to the door one on the inside & one on the outside by four screws or rivets passing through the inside escutcheon & the solid parts of the door above & below the mortise part screwing to, or riveting upon the outer escutcheon.

The inside escutcheon has a sliding knob attached to it near the outer edge, which knob being slid one quarter of an inch towards the centre of the escutcheon enters a square notch of a smaller escutcheon or plate attached to and moving with the spindle of the door handles or knobs and renders the same immoveable as also the [illegible]

bolt which is connected through the tumbler, with the said Spindle
and thus makes the Catch bolt answer the purpose of the thumb bolt
which in the common Mortice fastening is more expensive and more
difficult to move than said Sliding knob. The said Improved Mortice
fastening is formed of a plate of iron or other suitable Metal about two
inches wide by four inches long bent at one end to a right angle to form a face
through which the catch bolt passes to secure the door or the said face may
be a separate piece attached to said plate. The catch bolt is secured to said
plate by two staples & is moved by a Spring at the inner end of the plate
Said catch bolt is formed of a plate of iron about one eighth of an inch
thick three & a half inches long & three quarters of an inch wide except
for one inch and a half next the Spring where it is but half an inch wide
for the purpose of getting the door handle in the middle of the lock plate
Said bolt has a notch cut into its
side or edge about one quarter of an inch square & about one quarter of
an inch from the end next the Spring to receive the arm of the tumbler
also a similar notch on the same edge or side to receive the key bolt
when such is added to the said fastening. The said tumbler is formed
in part of a circular plate of iron about one inch in diameter and one
eighth of an inch thick with an arm projecting one quarter of an inch
from the outer edge of the circle which arm takes into the said notch of
the said Catch bolt, and moves the same; said part of the tumbler has
an opening in its centre about half an inch square through which
it receives a nut or rivet said nut or rivet being the remaining
part of the tumbler, is circular with a flanch at the end where it turns
in the lock plate and is square at the other end where it passes through
and is rivetted to the said circular plate or part of said tumbler the
lock plate being between and secured by the flanch of the nut or rivet
on the outside and by the circular plate of the tumbler on the inside
Said nut or rivet has also a square
hole in its centre through which the Spindle of the knobs or door handle
passes. This tumbler by being in two parts is held to the lock plate by a
flanch instead of being rivetted to it and the rivetting being on the tumbler & both moving is not liable to wear loose and separate from the lock plate as the common tumbler does from its being in one piece and rivetted to the stationary lock plate. The key bolt when such is applied to the said door fastening is very small and is secured to the lock plate at right angles with the catch bolt & when moved by the key shoots into the before mentioned notch of said catch bolt which is then immoveable and serves the purpose of the common key bolt.

The catch on the door frame which is usually straight has the angle or inclined plane requisite to force the catch bolt back and renders it unnecessary that said bolt should be any thicker than strength requires though the usual thickness of the catch bolt in door fastenings is nearly half an inch a thickness thought necessary to get an inclined plane of length and angle sufficient to force said bolt back on closing the door.

The above improvements are applicable to mortise door fastenings moved either by sliding or turning door knobs.

Said mortise door fastening may also be made with a top plate or cover which with the rivets or screws to secure it to the bottom or main plate would render the staples which secure the catch bolt to the main plate unnecessary. The tumblers in the latter case might be in one piece & both ends made to turn in the top & bottom plates in the common way.

What I claim as my improvements in said mortise lock or door fastening and for which I ask a patent is such a formation & combination of the before described parts of said door fastening (not heretofore so formed and combined in mortise door fastenings) as result in a mortise door fastening so flat or thin as not to weaken the the mortised part of the door like the common mortise fastening and so narrow as to be embraced & strengthened by the [illegible] and by the sliding knob on said [illegible] it being less expensive and more easily & surely moved than the [illegible] bolt of the common mortise fastening.

And by these improvements said mortise door fastening is made applicable to [illegible] doors than mortise fastenings

[illegible]. 2/25/1831 6396X have heretofore been used for & so simple in construction as to be afford[illegible]
at a less price than the like door fastenings have been heretofore sold for &
thus rendered capable of taking the place of the clumsy and inconvenien[t]
fastenings common to chamber doors and to the doors of houses of small
value and as such & being new is a useful improvement

[illegible] Witnesses
[illegible] Henry G. [illegible]
William [illegible] Elis

Leonard Foster (Patented February 25. 1831)

[1455 [illegible]]

1500 words

Dr [illegible] 1.00